(12) United States Patent
Tsai et al.

(10) Patent No.: US 7,773,167 B2
(45) Date of Patent: Aug. 10, 2010

(54) PIXEL STRUCTURE COMPRISING TWO FIRST CONDUCTIVE REGIONS, A SECOND CONDUCTIVE REGION AND TWO FIRST CHANNEL REGIONS, WHEREIN THE FIRST TRANSPARENT ELECTRODE IS LOCATED BETWEEN THE REFLECTIVE ELECTRODE AND SECOND TRANSPARENT ELECTRODE

(75) Inventors: Meng-Chang Tsai, Hsinchu (TW);
Tsung-Chin Cheng, Hsinchu (TW);
Chih-Jen Hu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 127 days.

(21) Appl. No.: 11/950,403

(22) Filed: Dec. 4, 2007

(65) Prior Publication Data

US 2009/0066893 A1 Mar. 12, 2009

(30) Foreign Application Priority Data

Sep. 11, 2007 (TW) .............................. 96133819 A (51) Int. Cl.
G02F 1/136 (2006.01)
G02F 1/1335 (2006.01)
H01L 31/00 (2006.01)

(52) U.S. Cl. .......................... 349/43; 349/42; 349/114; 257/59

(58) Field of Classification Search ................. 349/114, 349/39, 41, 42, 43, 44
See application file for complete search history.

(56) References Cited

U.S. PATENT DOCUMENTS 7,079,214 B2   7/2006   Shimoshikiryo

| | | |
|---|---|---|
| 2002/0060756 A1* | 5/2002 | Kurashina ..................... 349/39 |
| 2002/0149598 A1 | 10/2002 | Greier et al. |
| 2003/0090581 A1 | 5/2003 | Credelle et al. |
| 2003/0173629 A1* | 9/2003 | Gotoh ......................... 257/390 |
| 2003/0206179 A1 | 11/2003 | Deering |
| 2003/0227429 A1 | 12/2003 | Shimoshikiryo |
| 2005/0142680 A1* | 6/2005 | Ha et al. ........................ 438/30 |
| 2005/0280749 A1 | 12/2005 | Jung et al. |
| 2006/0001634 A1 | 1/2006 | Lee et al. |
| 2007/0126959 A1* | 6/2007 | Eguchi et al. ............... 349/114 |

FOREIGN PATENT DOCUMENTS

| TW | 200516329 | 5/2005 |
|---|---|---|
| TW | 237722 | 8/2005 |
| TW | 255378 | 5/2006 |
| TW | 255664 | 5/2006 |

\* cited by examiner

*Primary Examiner*—Andrew Schechter
*Assistant Examiner*—Dennis Y. Kim
(74) *Attorney, Agent, or Firm*—Jianq Chyun IP Office (57) ABSTRACT

A pixel structure disposed on a substrate and electrically connected to two scan lines and a data line is provided. The pixel structure includes a reflective electrode, a first transparent electrode, a second transparent electrode and a semiconductor layer. The first transparent electrode is electrically connected to the reflective electrode and is insulated from the second transparent electrode. The semiconductor layer has two first conductive regions, a second conductive region and two first channel regions, wherein the first conductive regions are respectively electrically connected to the reflective electrode and the second transparent electrode, the second conductive region is located between the first conductive regions and electrically connected to the data line, a part of the semiconductor layer overlapped with the scan lines is defined as first channel regions and each of the first channel regions is respectively electrically connected between the second conductive region and each first conductive region.

18 Claims, 8 Drawing Sheets

PIXEL STRUCTURE COMPRISING TWO FIRST CONDUCTIVE REGIONS, A SECOND CONDUCTIVE REGION AND TWO FIRST CHANNEL REGIONS, WHEREIN THE FIRST TRANSPARENT ELECTRODE IS LOCATED BETWEEN THE REFLECTIVE ELECTRODE AND SECOND TRANSPARENT ELECTRODE

CROSS-REFERENCE TO RELATED APPLICATION

This application claims the priority benefit of Taiwan application serial no. 96133819, filed on Sep. 11, 2007. The entirety of the above-mentioned patent application is hereby incorporated by reference herein and made a part of this specification.

BACKGROUND OF THE INVENTION

1. Field of the Invention

The present invention relates to a liquid crystal display panel (LCD panel), and more particularly, to an active device array substrate.

2. Description of Related Art

The market today requires a thin film transistor liquid crystal display (TFT-LCD) to have high contrast ratio, no gray scale inversion, less color shift, high luminance, high chroma, high color saturation, fast response and wide viewing angle. It is available for a TFT-LCD to provide a wide viewing angle nowadays that a technology of twisted nematic liquid crystal (TN liquid crystal) plus wide viewing film, in-plane switching LCD (IPS LCD), fringe field switching LCD (FFS LCD) and multi-domain vertically alignment LCD (MVA LCD), wherein with an MVA LCD, since alignment protrusions or slits formed on a color filter substrate (CFS) or on a TFT array substrate are used to make the liquid crystal molecules arranged in multi-directions alignment so as to obtain a plurality of different-alignment domains, therefore, an MVA LCD is capable of wide viewing.

Figure 1:
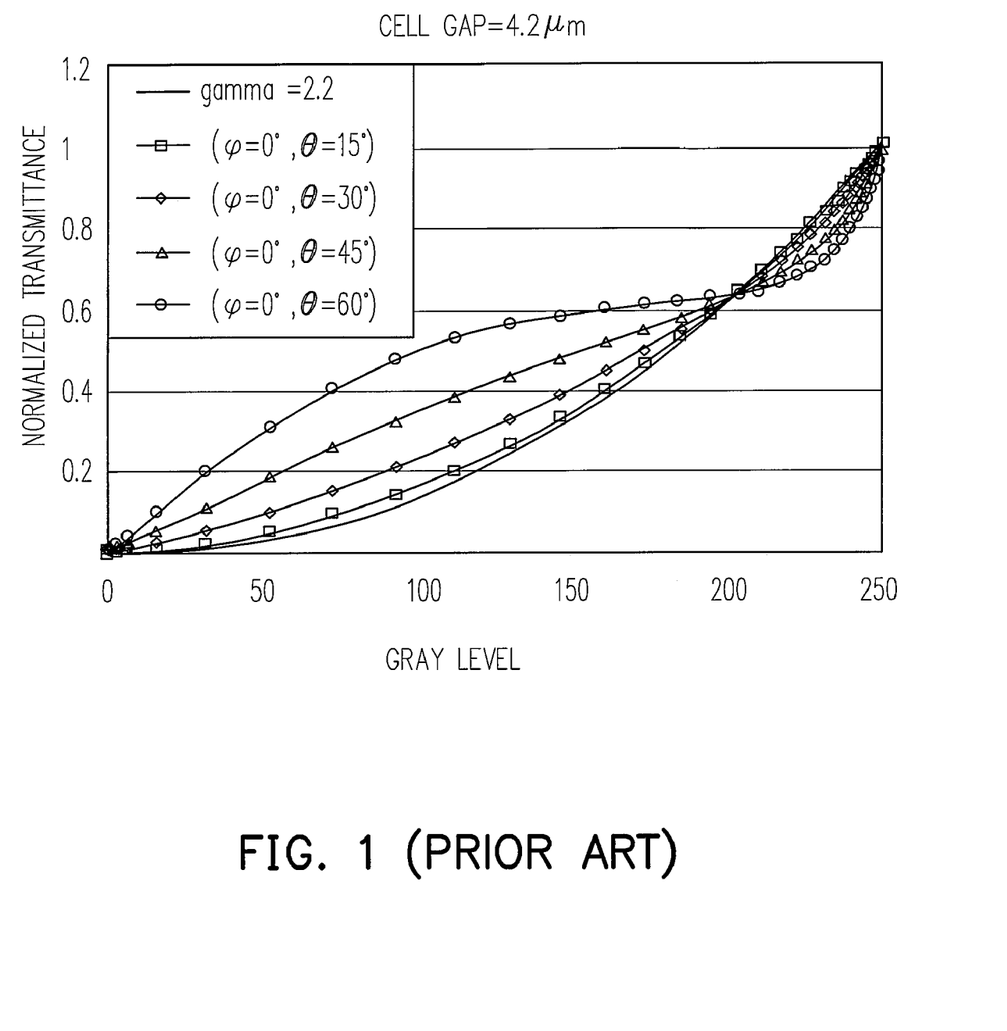
FIG. 1 is a graph showing relationship curves of the normalized transmittance vs. gray level of a conventional MVA LCD.

FIG. 1 is a graph showing relationship curves of the normalized transmittance vs. gray level of a conventional MVA LCD. Referring to FIG. 1, the abscissa herein represent gray level, while ordinate represents normalized transmittance. It can be seen from FIG. 1, although a MVA LCD has achieve the wide viewing angle requirement, but the wide viewing effect is varied with angles of viewing, where the curvatures of the curves of the normalized transmittance vs. gray level corresponding to different angles of viewing ($\phi$, $\theta$) are different. Specifically, $\phi$ is an azimuth, while $\theta$ is an elevation angle. In other words, when an angle ($\phi$, $\theta$) of viewing is changed, the frame luminance of a conventional NVA LCD varies, which further leads to color shift or color washout problem.

In order to solve the above-mentioned color shift problem, various conventional techniques have been provided, a solution herein is to form an additional capacitor in every single pixel, where different pixel electrodes in a single pixel respectively produce electrical field with different intensities by using capacitor coupling effect so as to make the liquid crystal molecules over different pixel electrodes have different arrangements. Although the above-mentioned technique is able to improve color shift, but an additional transistor is usually employed so as to stabilize the data voltage produced by the above-mentioned capacitor coupling effect, but the added transistors would decrease the aperture ratio of the liquid crystal display panel.

Another conventional solution is to add a transistor in each pixel, thus, a single pixel has two transistors. Since different transistors would make two pixel electrodes in a single pixel produce different electrical fields, and accordingly the liquid crystal molecules over the different pixel electrodes have different arrangements, color shift can be improved. However, such a solution requires two transistors formed in a single pixel, which causes a loss of aperture ratio as well.

Although the above-mentioned conventional techniques work to improve color shift phenomena for middle or small size LCDs, but they bring a loss of aperture ratio with the pixel design, so that a middle or small size LCD with an improved color shift suffers a drawback of insufficient luminance.

SUMMARY OF THE INVENTION

Accordingly, the present invention is directed to a pixel structure and a liquid crystal display panel (LCD panel) capable of improving color shift while keeping a certain degree of aperture ratio.

As embodied and broadly described herein, the present invention provides a pixel structure disposed on a substrate and electrically connected to two scan lines and a data line. The pixel structure includes a reflective electrode, a first transparent electrode, a second transparent electrode and a semiconductor layer. The first transparent electrode is electrically connected to the reflective electrode and is insulated from the second transparent electrode. The semiconductor layer has two first conductive regions, a second conductive region and two first channel regions, wherein the first conductive regions are respectively electrically connected to the reflective electrode and the second transparent electrode; the second conductive region is located between the two first conductive regions and electrically connected to the data line; a part of the semiconductor layer overlapped with the scan lines is defined as first channel regions and each of the first channel regions is respectively electrically connected between the second conductive region and each of the first conductive regions.

As embodied and broadly described herein, the present invention also provides an LCD panel including an active device array substrate, an opposite substrate and a liquid crystal layer located between the active device array substrate and the opposite substrate, wherein the active device array substrate includes a plurality of scan lines, a plurality of data lines interlaced with the scan lines and a plurality of pixels. Each of the pixels is respectively electrically connected to two of the scan lines and one of the data lines correspondingly, and each of the pixels includes a reflective electrode, a first transparent electrode, a second transparent electrode and a semiconductor layer. The first transparent electrode is electrically connected to the reflective electrode and insulated from the second transparent electrode. The insulating layer has two first conductive regions, a second conductive region and two first channel regions. The first conductive regions are respectively electrically connected to the reflective electrode and the second transparent electrode. The second conductive region is located between the two first conductive regions and electrically connected to the data line. A part of the semiconductor layer overlapped with the scan lines is defined as first channel regions and each of the first channel regions is respectively electrically connected between the second conductive region and each of the first conductive regions. A first display region herein corresponding to the first transparent electrode, a second display region corresponding to the second transparent electrode and a reflective display region corresponding to the reflective electrode are disposed between the active device array substrate, and the opposite substrate and the first display region and the second display region both driven by a same data voltage have different luminance.

In an embodiment of the present invention, each of the scan lines includes an extension portion, and a part of the semiconductor layer overlapped with the extension portion is defined as two second channel regions.

In an embodiment of the present invention, the pixel structure further includes a dielectric layer disposed between the second conductive region and the data line, wherein the dielectric layer has a via hole and the second conductive region is electrically connected to the data line through the via hole.

In an embodiment of the present invention, the pixel structure further includes an insulating layer disposed between the semiconductor layer and the reflective electrode and between the semiconductor layer and the second transparent electrode, wherein the insulating layer has two via holes, and the first conductive regions are respectively electrically connected to the reflective electrode and the second transparent electrode through the two via holes.

In an embodiment of the present invention, the material of the semiconductor layer includes polysilicon or amorphous silicon (a-Si).

In an embodiment of the present invention, the second conductive region of the pixel, the first channel region and the first conductive regions connected to the reflective electrode are disposed under the reflective electrode.

In an embodiment of the present invention, the pixel structure further includes a common line disposed under the reflective electrode.

In an embodiment of the present invention, the pixel structure further includes a transparent capacitor electrode electrically connected to the common line, and the transparent capacitor electrode is disposed under the reflective electrode, the first transparent electrode and the second transparent electrode. In another embodiment, the pixel structure further includes a transparent capacitor electrode electrically connected to the common line, wherein the transparent capacitor electrode is disposed under the reflective electrode and a main slit between the first transparent electrode and the second transparent electrode so as to form storage capacitors between the transparent capacitor electrode and the reflective electrode, between the transparent capacitor electrode and the first transparent electrode and between the transparent capacitor electrode and the second transparent electrode, respectively.

In an embodiment of the present invention, the area ratio of the first transparent electrode over the second transparent electrode ranges between about 3/7 and about 7/3. In other embodiments, the area of the first transparent electrode and the area of the second transparent electrode are substantially equal to each other.

In an embodiment of the present invention, the first transparent electrode is located between the reflective electrode and the second transparent electrode along the extending direction of the data line. In other embodiments, the reflective electrode is located between the first transparent electrode and the second transparent electrode along the extending direction of the data line.

In an embodiment of the present invention, the reflective electrode and the second transparent electrode respectively receive a first signal and a second signal different from each other.

In an embodiment of the present invention, all the first transparent electrodes located in all the pixels of the same row are aligned along the above-mentioned row direction. In other embodiments, the partial first transparent electrodes connected to the even data lines and located in the pixels of a same row are aligned along the above-mentioned row direction, and the partial first transparent electrodes connected to the odd data lines and located in the pixels of a same row are aligned along the above-mentioned row direction.

In an embodiment of the present invention, the pixels are presented in various bright-dark distribution modes, wherein the bright-dark distribution modes are respectively cyclically repeated in the column direction and in the row direction.

Based on the above described, the present invention makes a single second conductive region of the semiconductor layer electrically connected to the data line and uses different channel regions to input a same signal delivered by the data line to the first transparent electrode and the second transparent electrode respectively, so that the different transparent electrodes in each pixel produce different electrical fields to improve color shift phenomena. Meanwhile, in an embodiment of the present invention, a transparent capacitor electrode is adopted to form storage capacitors, which not only stabilizes display quality, but also significantly reduces the loss of aperture ratio. Furthermore, since the semiconductor layer of the present invention has a single second conductive region only and the most portion of the semiconductor layer is located under the reflective electrode, the present invention is able to keep a higher aperture ratio.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
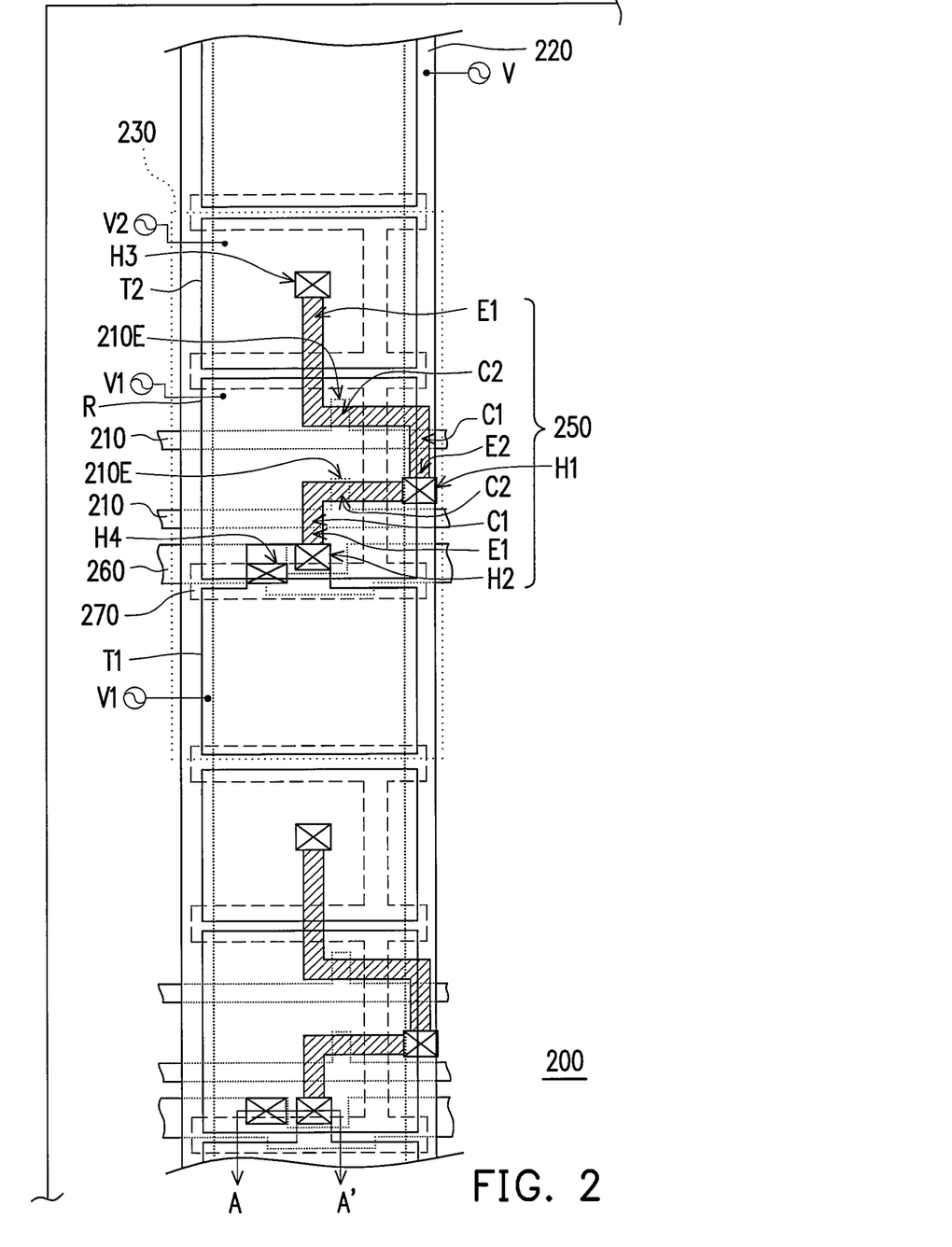
FIG. 2 is a diagram of an active device array substrate according to the present invention.

FIG. 2 is a diagram of an active device array substrate according to the present invention. Referring to FIG. 2, an active device array substrate 200 includes a plurality of scan lines 210, a plurality of data lines 220 and a plurality of pixels 230. In FIG. 2, only some pixels 230 of the active device array substrate 200 are shown. Each of the pixels 230 is electrically connected to two of the scan lines 210 and one of the data line 220 correspondingly, and each of the pixels 230 includes a reflective electrode R, a first transparent electrode T1, a second transparent electrode T2 and a semiconductor layer 250. The first transparent electrode T1 is electrically connected to the reflective electrode R and is electrically insulated from the second transparent electrode T2.

Referring to FIG. 2, the semiconductor layer 250 has two first conductive regions E1, a second conductive region E2 and two first channel regions C1, wherein the first conductive regions E1 are respectively electrically connected to the reflective electrode R and the second transparent electrode T2; the second conductive region E2 is located between the two first conductive regions E1 and is electrically connected to the data line 220; a part of the semiconductor layer 250 overlapped with the scan lines 210 is defined as first channel regions C1 and each of the first channel regions C1 is respectively electrically connected to between the second conductive region E2 and each of the first conductive regions E1.

In addition, the active device array substrate 200 further includes a dielectric layer (not shown) disposed between the second conductive region E2 and the data line 220, wherein the dielectric layer has a plurality of via holes H1, as shown in FIG. 2. The second conductive region E2 is electrically connected to the data line 220 through a single via hole H1. The material of the semiconductor layer 250 includes, for example, polysilicon or amorphous silicon (a-Si). In the embodiment, polysilicon is taken as an example to discuss. In order to further suppress leakage current to be produced when the pixel 230 is not driven, each scan line 210 further includes a plurality of extension portions 210E, as shown in FIG. 2, and a part of the semiconductor layer 250 overlapped with the extension portions 210E is defined as a plurality of second channel regions C2.

When the pixel 230 is driven, a signal V delivered by the data line 220 is input to the second conductive region E2 of the semiconductor layer 250 through the single via hole H1, then, the signal V is delivered to both sides thereof where the turned-on first channel regions C1 and second channel regions C2 are located and served as two different paths for the signal V to pass so as to produce different two signals, a first signal V1 and a second signal V2, which are respectively corresponding to the signal towards the reflective electrode R and the signal towards the second transparent electrode T2. In this way, when the pixel 230 is driven, the reflective electrode R and the second transparent electrode T2 respectively receive the first signal V1 and the second signal V2 through two different first conductive regions E1, so that both the reflective electrode R of the pixel 230 and the first transparent electrode T1 electrically connected to the reflective electrode R have the first signal V1, while the second transparent electrode T2 has the second signal V2.

It is noted that the embodiment is different from the prior art which employs two transistors in a single pixel 230, the present invention uses a single via hole H1 to deliver the signal V of the data line 220 through different paths in the semiconductor layer 250, so that the first transparent electrode T1 and the second transparent electrode T2 respectively receive the different first signal V1 and second signal V2 to obtain an improved color shift. In other words, in comparison with the conventional layout with two transistors in a pixel, each pixel 230 of the present invention is able to keep a higher aperture ratio. Further in addition, the most portion of the semiconductor layer 250 within each pixel 230 of the embodiment is located under the reflective electrode R, as shown in FIG. 2 where the second conductive region E2, the first channel region C1, the second channel region C2 and the first conductive regions E1 connected to the reflective electrode R are all disposed under the reflective electrode R, which significantly advances the aperture ratio.

In addition, the active device array substrate 200 further includes an insulating layer 280 (shown by FIG. 3) disposed between the semiconductor layer 250 and the reflective electrode R and between the semiconductor layer 250 and the second transparent electrode T2, wherein the insulating layer 280 has at least a via hole H. In FIG. 2, one of the first conductive regions E1 is electrically connected to the reflective electrode R through an above-mentioned via hole H2, while another first conductive region E1 is electrically connected to the second transparent electrode T2 through an above-mentioned via hole H3.

Figure 3:
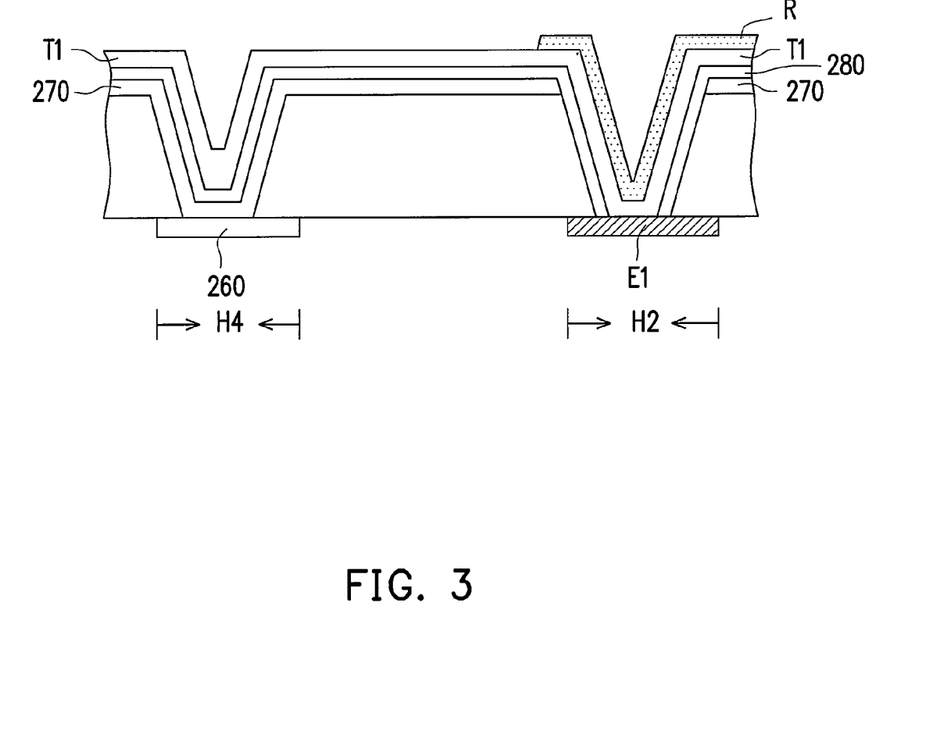
FIG. 3 is a cross-sectional diagram along a line A-A' in FIG. 2.

FIG. 3 is a cross-sectional diagram along a line A-A' in FIG. 2. Referring to FIGS. 2 and 3, an active device array substrate 200 further includes a common line 260 disposed under the reflective electrode R. Specifically, the active device array substrate 200 further includes a transparent capacitor electrode 270 electrically connected to the common line 260, and in each pixel 230, the transparent capacitor electrode 270 is disposed under the reflective electrode R, the first transparent electrode T1 and the second transparent electrode T2. In the embodiment, the insulating layer 280 further includes an additional via hole H4 through which the transparent capacitor electrode 270 is electrically connected to the common line 260. Thus, a storage capacitor is respectively formed between the transparent capacitor electrode 270 and the reflective electrode R, between the transparent capacitor electrode 270 and the first transparent electrode T1 and between the transparent capacitor electrode 270 and the second transparent electrode T2, such a design ensures the pixel 230 to keep a certain degree of aperture ratio and meanwhile to advance the stability of display quality. A design is certainly allowed to adjust the shape, quality and disposing position of the transparent capacitor electrode 270 or to modify the wiring between the transparent capacitor electrode 270 and the reflective electrode R according to the space of the pixel 230 available for design or other demands. For example, the transparent capacitor electrode 270 is disposed under the reflective electrode R and the second transparent electrode T2 only or disposed under the first transparent electrode T1 and the second transparent electrode T2 only.

Figure 4A:
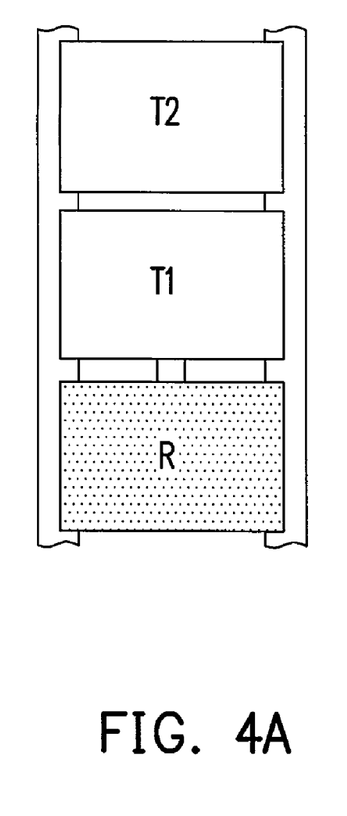
FIG. 4A is a pixel diagram in an active device array substrate according to the present invention.
Figure 4B:
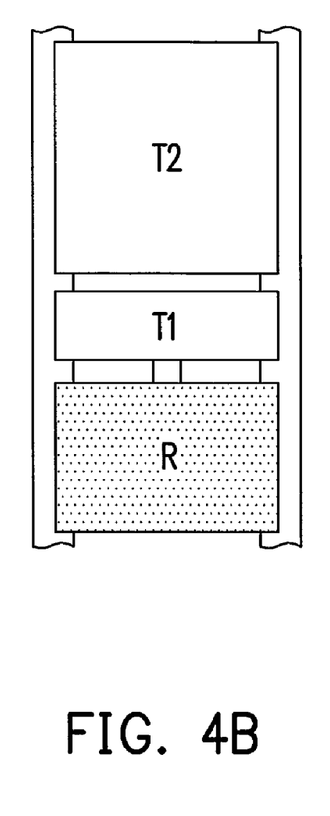
FIG. 4B is a pixel diagram in another active device array substrate according to the present invention.
Figure 4C:
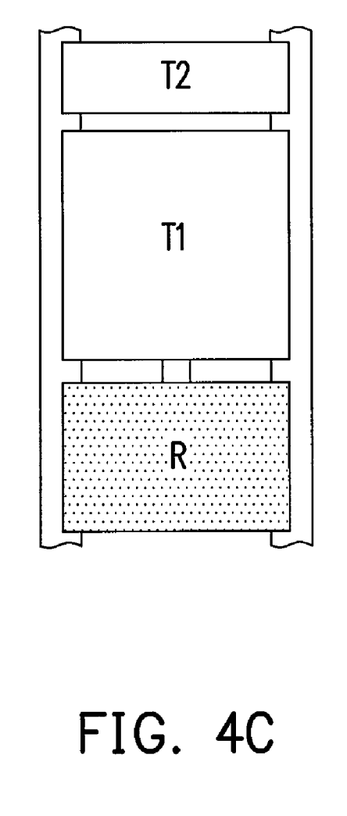
FIG. 4C is a pixel diagram in yet another active device array substrate according to the present invention.

In order to further enhance display quality, a designer is able to adjust the shapes and the disposing positions of the first transparent electrode T1 and the second transparent electrode T2 and the area ratio of one over another of T1 and T2. For example, in the embodiment, the reflective electrode R of each pixel 230 is located between the first transparent electrode T1 and the second transparent electrode T2, but in other embodiments, the first transparent electrode T1 of each pixel 230 is located between the reflective electrode R and the second transparent electrode T2, as shown by FIG. 4A. In addition, the areas of the first transparent electrode T1 and the second transparent electrode T2 of each pixel 230 are adjustable depending on design. For example, in FIG. 4A, the area of the first transparent electrode T1 and the area of the second transparent electrode T2 are substantially equal to each other; however, in FIG. 4B, the area ratio of the first transparent electrode T1 over the second transparent electrode T2 is about 3/7 and in FIG. 4C the area ratio of the first transparent electrode T1 over the second transparent electrode T2 is about 7/3. Certainly, the area ratio of T1 over T2 ranges between about 3/7 and about 7/3.

Figure 5A:
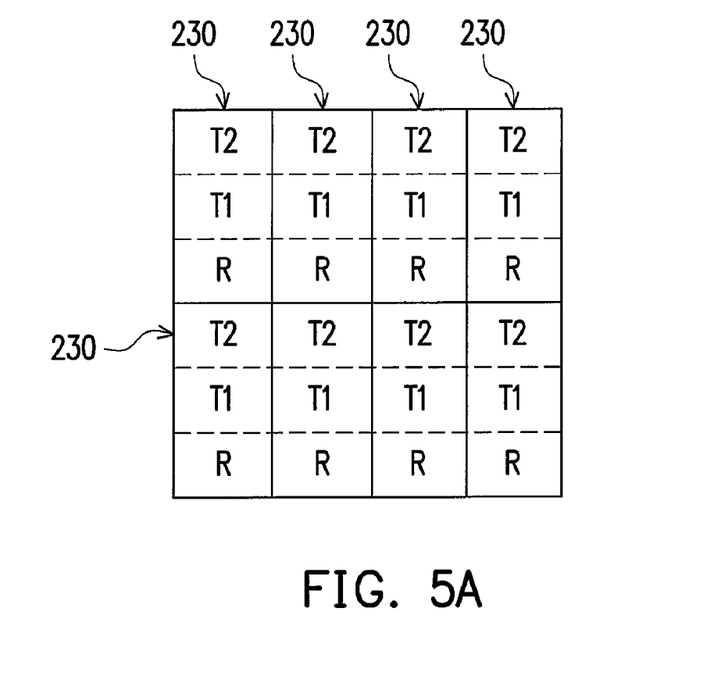
FIG. 5A is a pixel arrangement diagram in an active device array substrate according to the present invention.
Figure 5B:
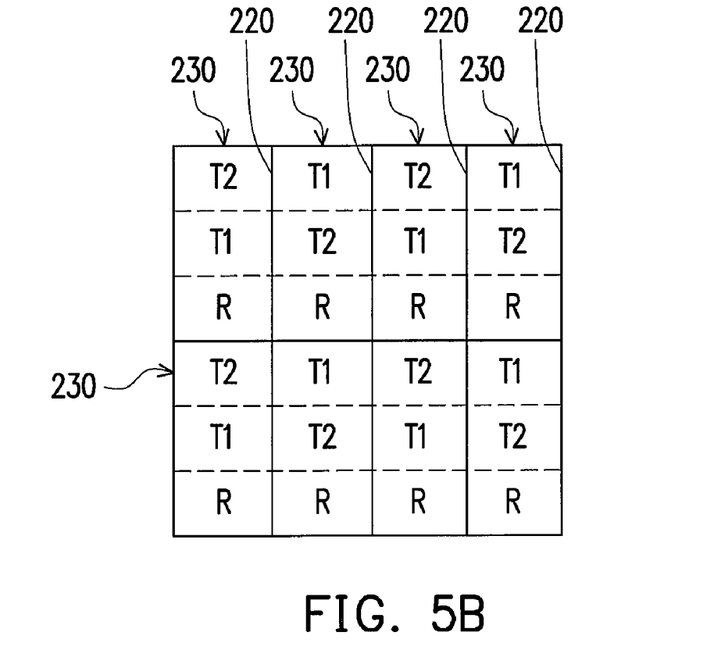
FIG. 5B is a pixel arrangement diagram in another active device array substrate according to the present invention.

FIG. 5A is a pixel arrangement diagram in an active device array substrate according to the present invention. Referring to FIG. 5A, all the first transparent electrodes T1 located in all the pixels 230 of a same row are aligned along the above-mentioned row direction. FIG. 5B is a pixel arrangement diagram in another active device array substrate according to the present invention. Referring to FIG. 5B, the partial first transparent electrodes T1 connected to the even data lines 220 and located in the pixels 230 of a same row are aligned along the above-mentioned row direction, and the partial first transparent electrodes T1 connected to the odd data lines 220 and located in the pixels 230 of a same row are aligned along the above-mentioned row direction.

Figure 6A:
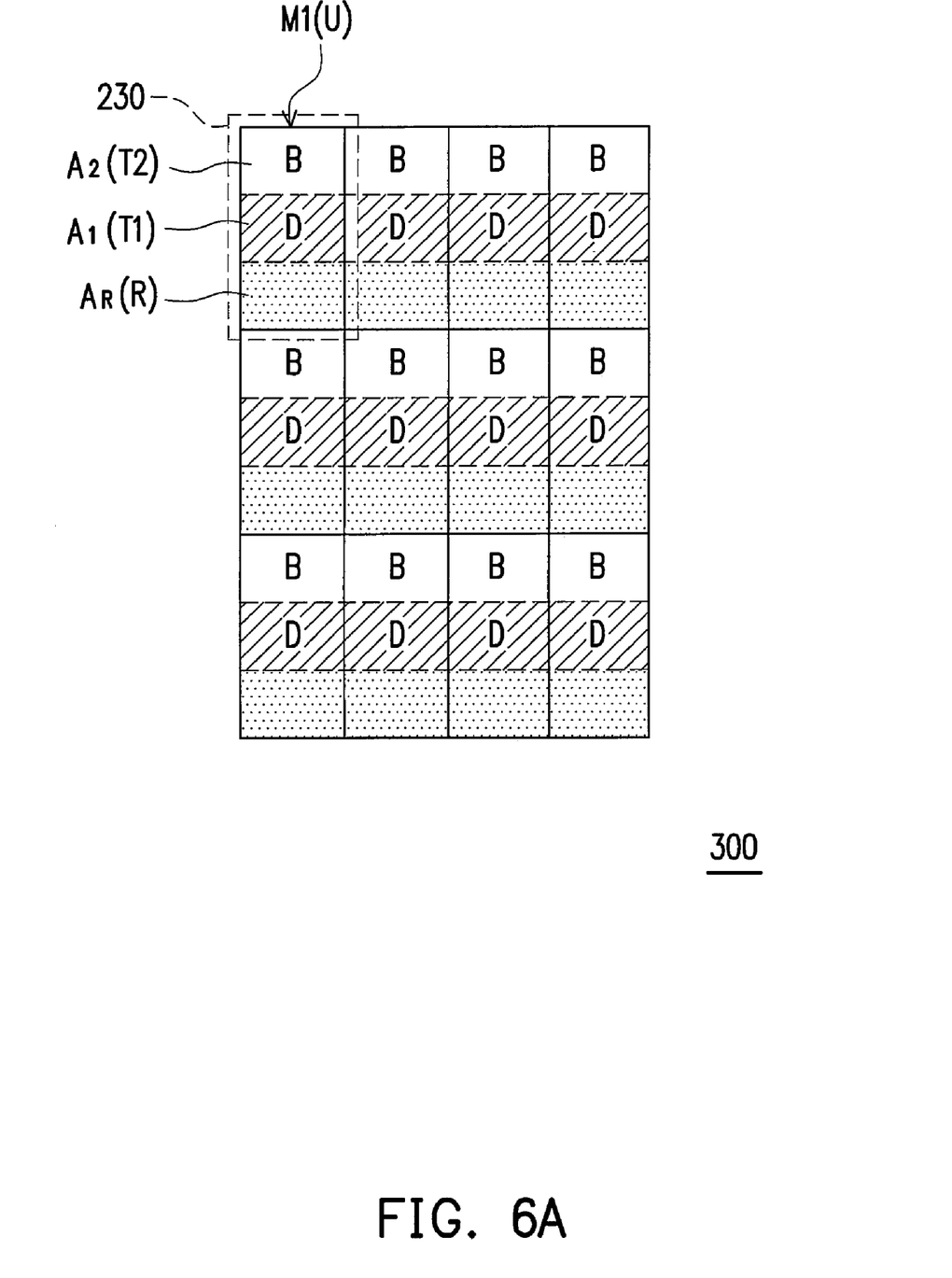
FIG. 6A is a display status diagram of an LCD panel according to the present invention.

FIG. 6A is a display status diagram of an LCD panel according to the present invention. Referring to FIG. 6A, a LCD panel 300 includes an above-mentioned active device array substrate 200, an opposite substrate (not shown) and a liquid crystal layer located between the active device array substrate 200 and the opposite substrate, wherein the LCD panel 300 has a first display region $A_1$ corresponding to the first transparent electrode T1, a second display region $A_2$ corresponding to the second transparent electrode T2 and a reflective display region $A_R$ corresponding to the reflective electrode R, and when every pixel 230 is driven by a same data voltage, the first display region $A_1$ and the second display region $A_2$ thereof are presented in different luminance.

The pixels 230 in the LCD panel 300 of the present invention are suitable to be presented in various bright-dark distribution modes; in particular, a bright-dark distribution mode is cyclically repeated in a column direction. Specifically, a bright-dark distribution mode means a brightness/darkness assignment to the first display region $A_1$ and the second display region $A_2$ in a pixel 230, wherein the area ratio of the first display region $A_1$ over the second display region $A_2$ does not affect the definition of a bright-dark distribution mode. For example, it is assumed a first bright-dark distribution mode M1 represents the luminance of the first display region $A_1$ is lower than the second display region $A_2$ in a pixel 230, a second bright-dark distribution mode M2 represents the luminance of the first display region $A_1$ is higher than the second display region $A_2$ in a pixel 230, but the disposing position of the reflective display region $A_R$ is not specified. In the embodiment, the first display region $A_1$ is located between the second display region $A_2$ and the reflective display region $A_R$. As shown by FIG. 6A, in each pixel 230, a dark display region D is located between a bright display region B and a reflective display region $A_R$; therefore, a bright-dark distribution mode M1 is served as a unit U to be cyclically repeated in the column direction of the LCD panel 300. Nevertheless, the LCD panel 300 can be presented by cyclically repeating the unit U of the same bright-dark distribution mode M1 along the row direction as well.

Figure 6B:
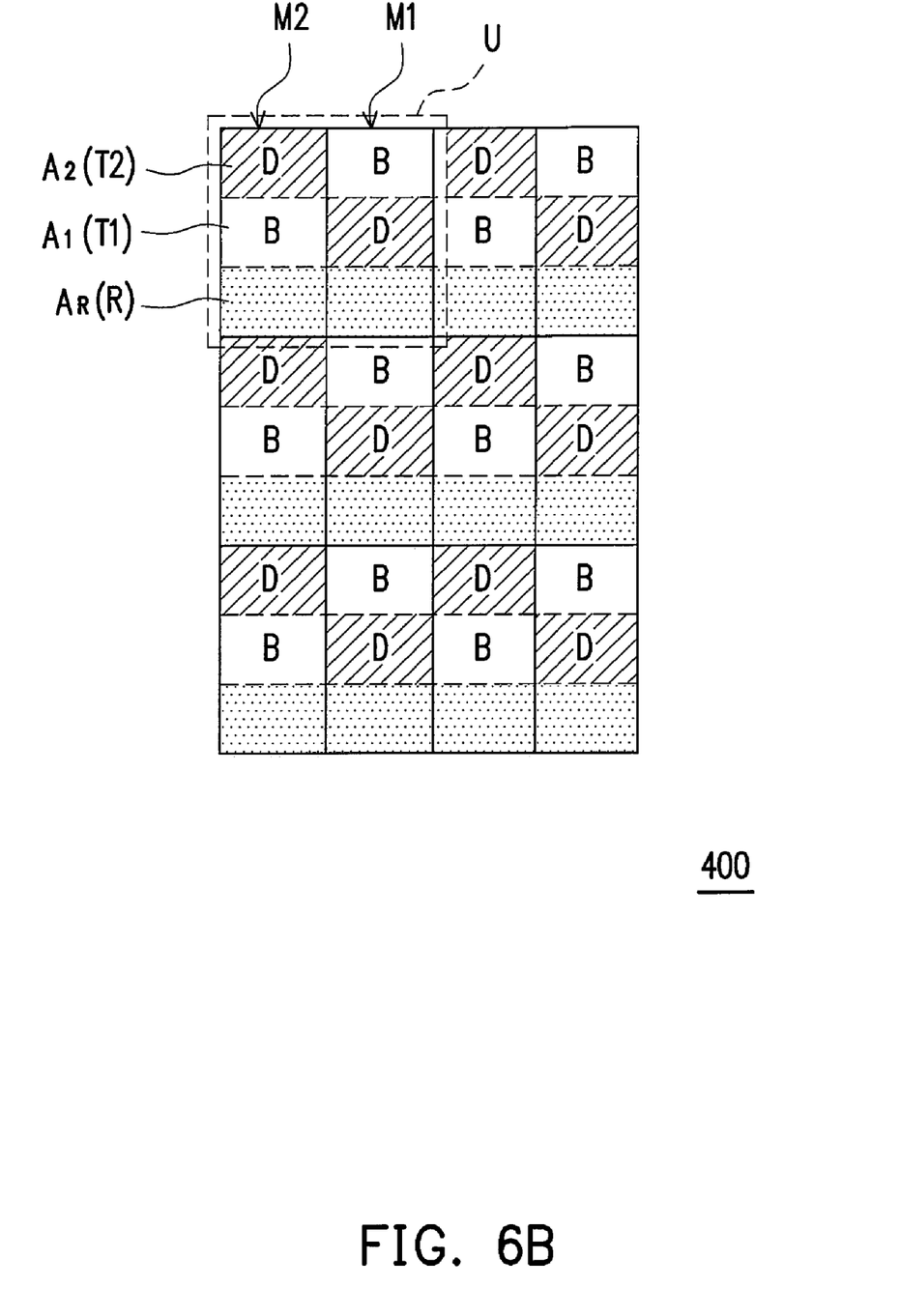
FIG. 6B is another display status diagram of an LCD panel according to the present invention.

FIG. 6B is another display status diagram of an LCD panel according to the present invention. Referring to FIG. 6B, an LCD panel 400 has a second bright-dark distribution mode M2 of a pixel 230 where although the first display region $A_1$ is still located between the second display region $A_2$ and the reflective display region $A_R$, but the bright display region B is located between the dark display region D and the reflective display region $A_R$. Thus, the pixels 230 of the first line in the LCD panel 400 are cyclically arranged from left to right by the second bright-dark distribution mode M2 and the first bright-dark distribution mode M1. In other words, in the embodiment, the LCD panel 400 is presented by a unit U cyclically repeated in the row direction and composed of the second bright-dark distribution mode M2 and the first bright-dark distribution mode M1 of two pixels 230. In addition, the present invention does not limit the area ratio of the first display region $A_1$ over the second display region $A_2$, the shapes thereof and the disposing position of the reflective display region $A_R$ in each pixel 230. Certainly, the LCD panel 400 can be presented by cyclically repeating a same bright-dark distribution mode as the unit along the row direction.

Figure 6C:
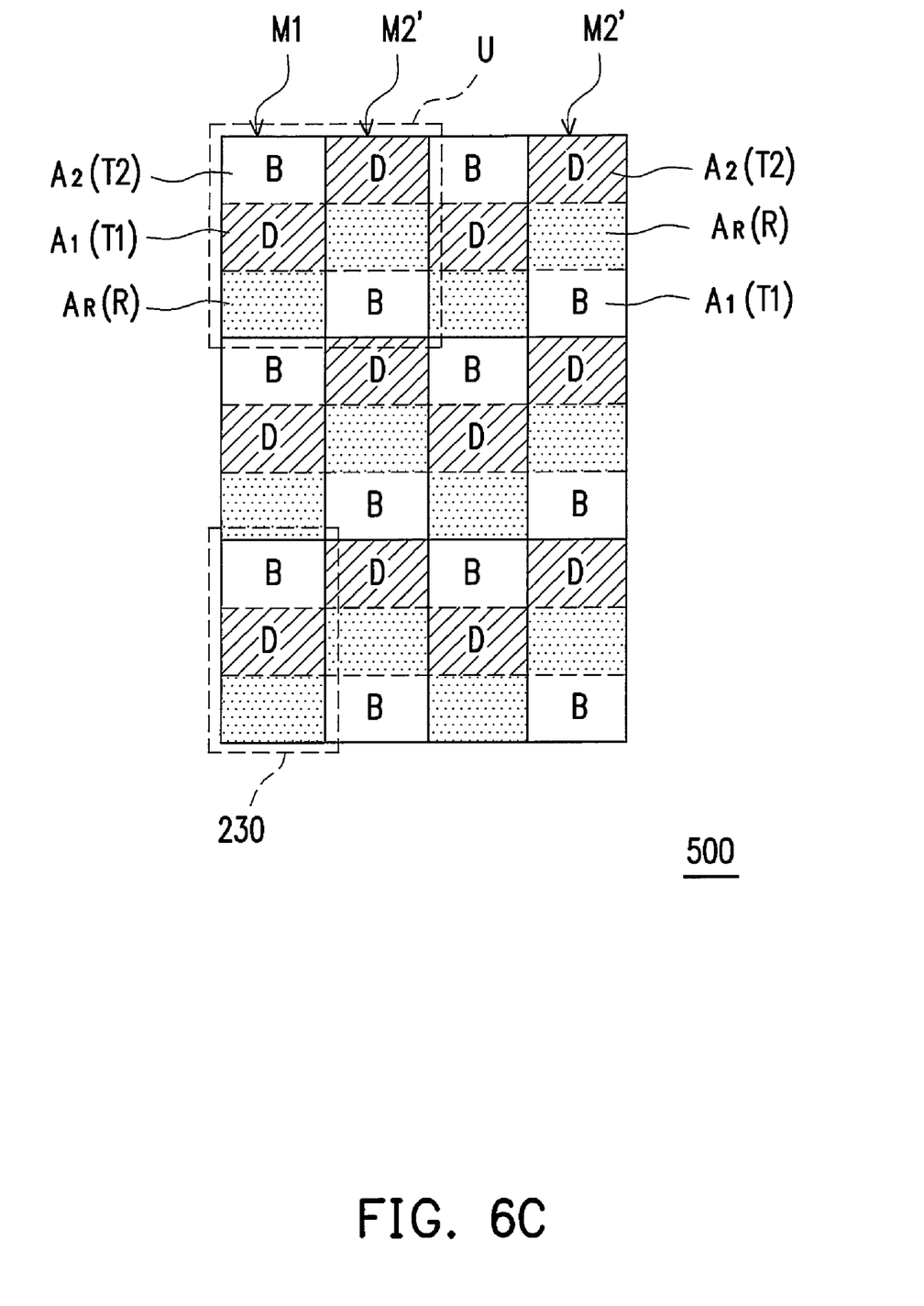
FIG. 6C is yet another display status diagram of an LCD panel according to the present invention.

FIG. 6C is yet another display status diagram of an LCD panel according to the present invention. Referring to FIG. 6C, an LCD panel 500 has a second bright-dark distribution mode M2' of a pixel 230 where the reflective display region $A_R$ is located between the second display region $A_2$ and the first display region $A_1$, that is, the reflective display region $A_R$ is located between the dark display region D and the bright display region B. Thus, the pixels 230 of the first line in the LCD panel 500 are cyclically arranged from left to right by the first bright-dark distribution mode M1 and the second bright-dark distribution mode M2'. In other words, in the embodiment, the LCD panel 500 is presented by a unit U cyclically repeated in the row direction and composed of the first bright-dark distribution mode M1 and the second bright-dark distribution mode M2' of two pixels 230. In addition, the present invention does not limit the area ratio of the first display region $A_1$ over the second display region $A_2$, the shapes thereof and the disposing position of the reflective display region $A_R$ in each pixel 230. Certainly, the LCD panel 500 can be presented by cyclically repeating a same bright-dark distribution mode as the unit along the row direction. Note that the pixels in an LCD panel are able to be presented in various bright-dark distribution modes, the present embodiments herein exemplarily take, but not limited to by the present invention, the above-mentioned three bright-dark distribution modes only.

Based on the above described, the present invention makes different transparent electrodes in each pixel respectively produce different electrical fields by the single second conductive region of the semiconductor layer so as to improve color shift. Besides, the semiconductor layer in the present invention is almost disposed under the reflective electrode; thus, the present invention is able to keep a higher aperture ratio, meanwhile enhance display quality by using the transparent capacitor electrode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
   a substrate having a plurality of pixel regions;
   two scan lines and a data line disposed within one of the pixel region;
   a reflective electrode disposed within said pixel region;
   a first transparent electrode disposed within said pixel region and electrically connected to the reflective electrode;
   a second transparent electrode disposed within said pixel region and electrically insulated from the first transparent electrode, wherein the first transparent electrode is located between the reflective electrode and the second transparent electrode along an extending direction of the data line; and
   a single semiconductor pattern disposed within said pixel region and having two first conductive regions, a second conductive region and two first channel regions, wherein the first conductive regions are respectively electrically connected to the reflective electrode and the second transparent electrode, the second conductive region is located between the first conductive regions and electrically connected to the data line, a part of the semiconductor layer overlapped with the scan lines is defined as the first channel regions and the first channel regions are respectively electrically connected between the second conductive region and the first conductive regions.

2. The pixel structure according to claim 1, wherein each of the scan lines further comprises an extension portion and a part of the semiconductor layer overlapped with the extension portion is defined as two second channel regions.

3. The pixel structure according to claim 1, further comprising a dielectric layer disposed between the second conductive region and the data line, wherein the dielectric layer has a via hole and the second conductive region is electrically connected to the data line through the via hole.

4. The pixel structure according to claim 1, further comprising an insulation layer disposed between the semiconductor layer and the reflective electrode and between the semiconductor layer and the second transparent electrode, wherein the insulation layer has two via holes and the first conductive regions are respectively electrically connected to the reflective electrode and the second transparent electrode through the via holes.

5. The pixel structure according to claim 1, wherein a material of the semiconductor layer comprises polysilicon or amorphous silicon (a-Si).

6. The pixel structure according to claim 1, wherein the second conductive region, the first channel regions and the first conductive regions connected to the reflective electrode are disposed under the reflective electrode.

7. The pixel structure according to claim 1, further comprising a common line disposed under the reflective electrode.

8. The pixel structure according to claim 7, further comprising a transparent capacitor electrode electrically connected to the common line, wherein the transparent capacitor electrode is disposed under the reflective electrode, the first transparent electrode and the second transparent electrode.

9. The pixel structure according to claim 7, further comprising a transparent capacitor electrode electrically connected to the common line, wherein the transparent capacitor electrode is disposed under the reflective electrode, the first transparent electrode and the second transparent electrode so as to form storage capacitors between the transparent capacitor electrode and the reflective electrode, between the transparent capacitor electrode and the first transparent electrode and between the transparent capacitor electrode and the second transparent electrode, respectively.

10. The pixel structure according to claim 1, wherein an area ratio of the first transparent electrode over the second transparent electrode ranges between about 3/7 and about 7/3.

11. The pixel structure according to claim 1, wherein an area of the first transparent electrode and the area of the second transparent electrode are substantially equal to each other.

12. The pixel structure according to claim 1, wherein the reflective electrode and the second transparent electrode respectively receive a first signal and a second signal different from each other.

13. A liquid crystal display panel (LCD panel), comprising:
an active device array substrate having a plurality of pixel regions, comprising:
a plurality of scan lines;
a plurality of data lines interlaced with the scan lines; and
a plurality of pixels, each pixel being disposed within one of the pixel regions, wherein each pixel is respectively electrically connected to two of the scan lines and one of the data lines correspondingly within one of the pixel regions, and said pixel comprises:
a reflective electrode disposed within said pixel region;
a first transparent electrode, disposed within said pixel region and electrically connected to the reflective electrode;
a second transparent electrode, disposed within said pixel region and electrically insulated from the first transparent electrode, wherein the first transparent electrode is located between the reflective electrode and the second transparent electrode along an extending direction of the data lines; and
a single semiconductor pattern, disposed within said pixel region and having two first conductive regions, a second conductive region and two first channel regions, wherein the first conductive regions are respectively electrically connected to the reflective electrode and the second transparent electrode, the second conductive region is located between the first conductive regions and electrically connected to the data line, a part of the semiconductor layer overlapped with the corresponding two scan lines is defined as the first channel regions and the first channel regions are respectively electrically connected between the second conductive region and the first conductive regions;
an opposite substrate; and
a liquid crystal layer located between the active device array substrate and the opposite substrate, wherein a first display region corresponding to the first transparent electrode, a second display region corresponding to the second transparent electrode and a reflective display region corresponding to the reflective electrode are disposed between the active device array substrate and the opposite substrate, and the first display region and the second display region driven by a same data voltage are presented in different luminance.

14. The liquid crystal display panel according to claim 13, wherein the pixels are presented in a plurality of bright-dark distribution modes, and the bright-dark distribution modes of the pixels are respectively cyclically repeated in the column direction and in the row direction.

15. The liquid crystal display panel according to claim 13, wherein the all the first transparent electrodes located in all the pixels of a same row are aligned along the row direction.

16. The liquid crystal display panel according to claim 13, wherein the first transparent electrodes which are connected to the even data lines and located in the pixels of a same row are aligned along the row direction, and the first transparent electrodes which are connected to the odd data lines and located in the pixels of a same row are aligned along the row direction.

17. The liquid crystal display panel according to claim 13, wherein an area ratio of the first transparent electrode over the second transparent electrode ranges between about 3/7 and about 7/3.

18. The pixel structure according to claim 13, wherein an area of the first transparent electrode and the area of the second transparent electrode are substantially equal to each other.

* * * * *